(12) United States Patent
Kim

(10) Patent No.: US 10,706,211 B2
(45) Date of Patent: Jul. 7, 2020

(54) METHOD AND STORAGE MEDIUM FOR DISPLAYING TEXT ON SCREEN OF PORTABLE TERMINAL

(71) Applicant: Sung Il Kim, Seoul (KR)

(72) Inventor: Sung Il Kim, Seoul (KR)

( * ) Notice: Subject to any disclaimer, the term of this patent is extended or adjusted under 35 U.S.C. 154(b) by 66 days.

(21) Appl. No.: 15/742,128

(22) PCT Filed: Jul. 6, 2016

(86) PCT No.: PCT/KR2016/007308
§ 371 (c)(1),
(2) Date: Jan. 5, 2018

(87) PCT Pub. No.: WO2017/010732
PCT Pub. Date: Jan. 19, 2017

(65) Prior Publication Data
US 2018/0196786 A1 Jul. 12, 2018

(30) Foreign Application Priority Data
Jul. 10, 2015 (KR) .......................... 10-2015-0098678

(51) Int. Cl.
*G06F 40/106* (2020.01)
*G06F 3/0488* (2013.01)
(Continued)

(52) U.S. Cl.
CPC .......... *G06F 40/106* (2020.01); *G06F 3/0488* (2013.01); *G06F 3/04886* (2013.01);
(Continued)

(58) Field of Classification Search
CPC .... G06F 17/212; G06F 3/0488; G06F 40/106; H04M 1/72552; H04M 2250/70
See application file for complete search history.

(56) References Cited

U.S. PATENT DOCUMENTS

2007/0211062 A1 9/2007 Engelman et al.
2012/0293427 A1* 11/2012 Mukai ................. G06F 3/04883
345/173
2013/0215120 A1* 8/2013 Cornell ................... G06T 11/20
345/470

FOREIGN PATENT DOCUMENTS

JP 11-202884 A 7/1999
JP 2000-338952 A 12/2000
(Continued)

OTHER PUBLICATIONS

Search Report, dated Nov. 9, 2016, for International Application No. PCT/KR2016/007308.
(Continued)

*Primary Examiner* — Roland J Casillas
(74) *Attorney, Agent, or Firm* — LRK Patent Law Firm

(57) ABSTRACT

A method for displaying a text on a screen of a portable terminal includes at least one special text alignment line for aligning and displaying a text in at least one of positions above and below a normal text alignment line along which a text is normally aligned and displayed, where a text is aligned and displayed along the special text alignment line such that the text positioned on the special text alignment line has a predetermined height which is 90% or greater than the height of a text positioned on the normal text alignment line just in front of the text on the special text alignment line.

9 Claims, 13 Drawing Sheets

1 2 3 4

(51) Int. Cl.
*H04M 1/725* (2006.01)
*H04B 1/3827* (2015.01)
(52) U.S. Cl.
CPC ...... *H04B 1/3833* (2013.01); *H04M 1/72552* (2013.01); *H04M 2250/70* (2013.01)

(56) References Cited

FOREIGN PATENT DOCUMENTS

JP      2014-521148  A    8/2014
KR       10-1002524  B1   12/2010

OTHER PUBLICATIONS

Written Opinion, dated Nov. 9, 2016, for International Application No. PCT/KR2016/007308.

\* cited by examiner

METHOD AND STORAGE MEDIUM FOR DISPLAYING TEXT ON SCREEN OF PORTABLE TERMINAL

CROSS-REFERENCE TO RELATED APPLICATIONS

The present application is a U.S. National Phase entry from International Application No. PCT/KR2016/007308, filed Jul. 6, 2016, which claims priority to Korean Patent Application No. 10-2015-0098678, filed Jul. 10, 2015, the disclosure of which is incorporated by reference herein in its entirety.

BACKGROUND OF THE INVENTION

1. Field of the Invention

The present invention relates to a method of displaying a text on a screen of a portable terminal, and more particularly, to a method of displaying a text on a screen of a portable terminal at an upper and/or lower side with respect to a normal text alignment line or obliquely displaying it, and a storage medium therefor.

2. Description of Related Art

As portable terminals such as smart phones are rapidly spreading, users of portable terminals may easily exchange information with others through the Internet while on the move.

For the users of portable terminals, it has become common to communicate news to partners or publish their own sentences through instant messenger applications such as Line, SNS, or the like installed in the portable computers. In other words, it became natural to transceive or publish their sentences through the Internet.

However, the reason that the users transceive or publish their texts through the portable terminals is to convey their emotions or arouse empathy in addition to texts. For this reason, the instant messengers and the like installed in the portable terminals includes emoticons for conveying emotions or empathy of the users, so that the emoticons have been developed such that the users can easily and quickly communicate emotions to the others therethrough.

Existing portable terminals use a lot of emoticons as a means of displaying user's emotions. Specifically, emoticons which were initially used in computing devices used texts in combinations, but current emoticons have evolved into letters and pictures including emotions such as user's pleasure, sorrow, surprise, and empathy.

However, a method of displaying user's emotion, importance, or the like by arranging texts at an upper or lower side of a normal text alignment line in which texts are arranged and displayed on a screen of the portable terminal has not yet been provided.

A position of a text may be switched between an upper position and a lower position by using superscript or subscript. However, the superscript or subscript is smaller than a general text in size and is used only for a formula or the like, and does not have a function of conveying user's emotion or importance.

SUMMARY OF THE INVENTION

Accordingly, the present invention, which is contrived to solve the aforementioned problems, provides a method of arranging and displaying a text at an upper or lower side with respect to a normal text alignment line in a portable terminal.

The present invention provides a method of arranging and displaying a text on a text alignment line inclined at a specific angle with respect to a normal text alignment line in the portable terminal.

The present invention provides a method of changing a position of the text alignment line in which the text is positioned or a text pattern in the portable terminal such that users can express their emotion.

To accomplish this purpose, an aspect of the present invention features a method of displaying a text on a screen of a portable terminal, including: providing at least one specific text alignment line in which texts are arranged to be displayed, on at least one of an upper side or a lower side of a normal text alignment line in which texts are generally arranged to be displayed; predetermining a height of a text positioned in the specific text alignment line to be 90% or more of a height of a text positioned in a normal text alignment line immediately before it; and displaying the text by arranging it in the specific text alignment line.

Another aspect of the present invention features a method of displaying a text on a screen of a portable terminal, including arranging and displaying a text in a specific text alignment line that is inclined at a specific angle with respect to a normal text alignment line in which a text is generally arranged.

Advantageous Effects

The present invention, which is devised to solve the above-mentioned problems, accomplishes an effect of arranging and displaying a text at an upper or lower side with respect to a normal text alignment line in a portable terminal.

The present invention accomplishes an effect of arranging and displaying a text on a text alignment line having a specific gradient with respect to a normal text alignment line in the portable terminal.

The present invention accomplishes an effect of changing a position of a text alignment line in which a text is positioned in the portable terminal, or a text pattern thereof.

BRIEF DESCRIPTION OF THE DRAWINGS

FIG. 10 and FIG. 11 illustrate examples of displaying texts are displayed on a specific text alignment line that is inclined at a specific angle according to an exemplary embodiment of the present invention

DETAILED DESCRIPTION OF THE INVENTION

Hereinafter, exemplary embodiments of the present invention will be described in detail with reference to the accompanying drawings. However, in detailed descriptions of operating principles of the exemplary embodiments, a detailed description of related well-known functions or configurations which is determined to evade the point of the present invention will be omitted. This is to more clearly describe the point of the present invention without evading the core of the present invention by omitting unnecessary descriptions.

The terms used in the description are intended to describe certain embodiments only, and shall by no means restrict the present invention. Unless clearly used otherwise, expressions in the singular number include a plural meaning.

A portable terminal described in the present invention may be a communications terminal that may be used by a user while carrying it as any terminal that includes a computing function, a screen, and data communication capability, to mutually transmit information to other terminals and to perform power supply therein, such as a smart phone, a personal digital assistant (PDA), a tablet PC, and a smart watch. The portable terminal may include a touch screen to receive an input that is made by contacting the touch screen by a user hand, and may be formed to include a function of downloading a specific application to install it or delete it.

Figure 1:
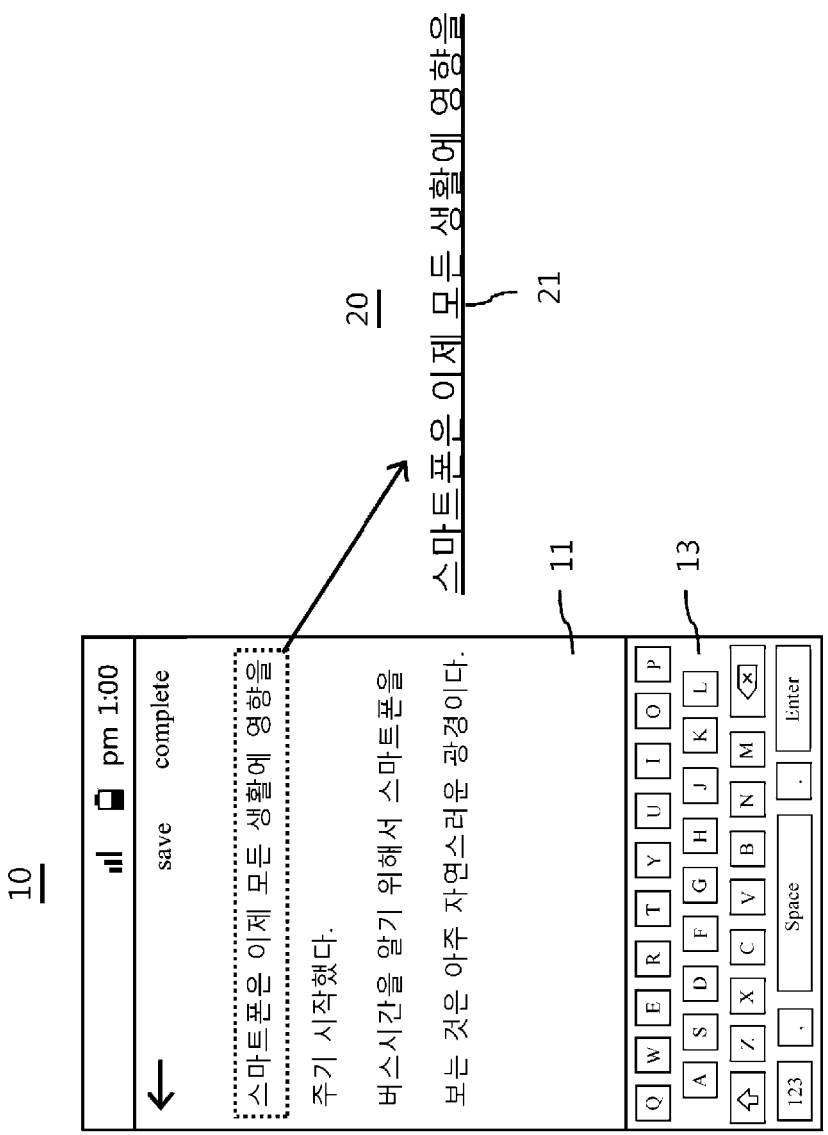
FIG. 1 illustrates a screen of the portable terminal and sample sentences.

FIG. 1 illustrates a screen 10 of a portable terminal and sample sentences 20.

The drawing illustrates the screen 10 obtained by executing a text editor in the portable terminal, including a text display window 11 for displaying inputted letters and a virtual keyboard window 13. In this case, some of sentences displayed in the text display window 11 are referred to as sample sentences 20.

In this case, the sample sentences 20 are displayed on the screen 10 of the portable terminal such that a bottom portion of each of the sample sentences 20 may be arranged in an invisible straight line, which is referred to as a normal text alignment line 21 in the present exemplary embodiment. In the present exemplary embodiment, the normal text alignment line indicates a line in which general texts are arranged without including invisible lines in which superscripts and subscripts are respectively arranged.

Figure 2:
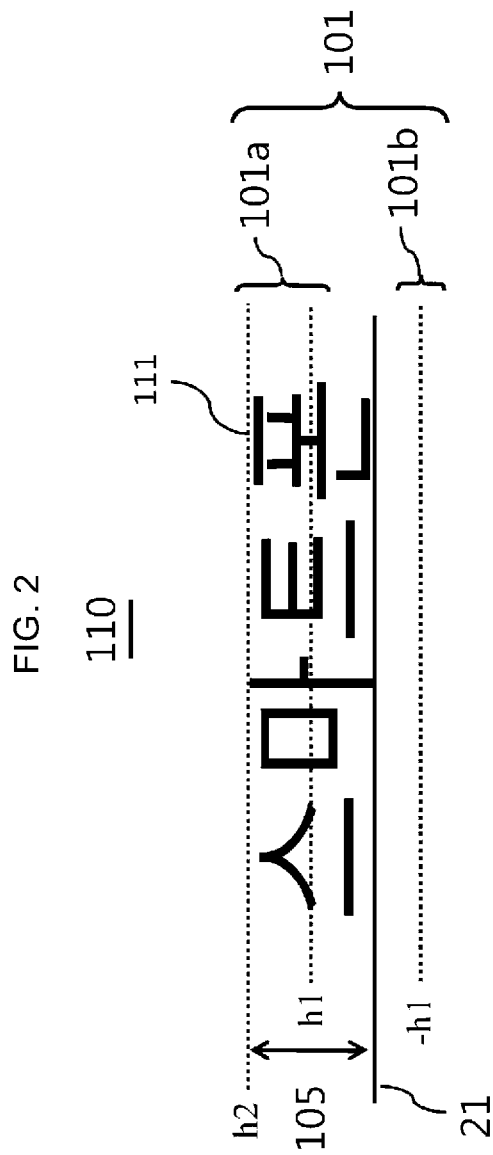
FIG. 2 illustrates an example of a specific text alignment line according to an exemplary embodiment of the present invention.

FIG. 2 illustrates an example of a specific text alignment line according to an exemplary embodiment of the present invention.

In the drawing, a solid line indicates a normal text alignment line 21, and a dotted line indicates a specific text alignment line 101 according to the present exemplary embodiment. Texts may be arranged in the specific text alignment line. In the drawing, the specific text alignment line according to the present exemplary embodiment includes an upper specific text alignment line 101a including a first specific text alignment line h1 and a second specific text alignment line h2 positioned above the normal text alignment line 21 with respect to the normal text alignment line; and a lower specific text alignment line 101b including a first specific text alignment line −h1 positioned below the normal text alignment line 21. Specific text alignment lines of the example 110 includes two specific text alignment lines positioned above the normal text alignment line 21 and one specific text alignment line positioned therebelow.

The normal text alignment line 21 indicates an invisible line in which bottom portions of texts are arranged in a straight-line form on the screen of the portable terminal. In FIG. 2, a word "스마트폰" is arranged along the normal text alignment line 21 to be displayed.

In the present exemplary embodiment, the normal text alignment line 21 indicates an invisible line 21 in which portions of general texts are arranged to be displayed on the screen of the portable terminal. Herein, the general texts indicate common texts except superscripts and subscripts.

According to the present exemplary embodiment, a method of displaying a text on a screen of a portable terminal includes providing at least one specific text alignment line 101 in which texts are arranged to be displayed, on at least one of an upper side or a lower side of the normal text alignment line 21 in which texts are generally arranged to be displayed; predetermining a height of a text positioned in the specific text alignment line to be 90% or more of a height of a text positioned in a normal text alignment line immediately before it; and displaying the text by arranging it in the specific text alignment line.

Figure 3:
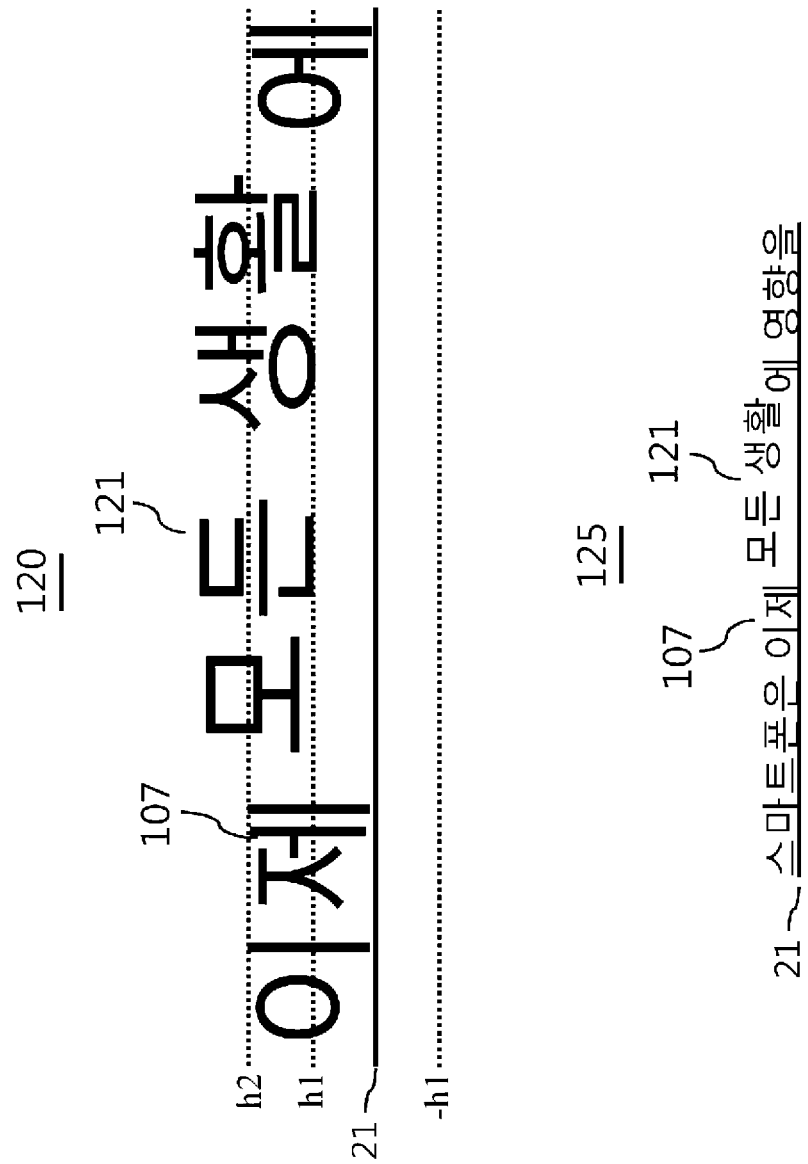
FIG. 3 to FIG. 5 illustrate examples to which specific text alignment lines are applied.

In the present exemplary embodiment, the predetermined height of the text positioned in the specific text alignment line indicates a predetermined text height applied when the text is inputted into the specific text alignment line. In FIG. 3, a predetermined text height of "모든 생활" positioned in the upper first specific text alignment line h1 is the same as a text height of "이제" positioned in the normal text alignment line immediately before it.

The specific text alignment line according to the present exemplary embodiment may be positioned above or below the normal text alignment line 21 by a specific position, and may be in parallel with the normal text alignment line. Bottom portions of the texts positioned in the specific text alignment line may be arranged in the specific text alignment line to be displayed on the screen of the portable terminal.

Alternatively, the specific text alignment line may be a line that is inclined at a specific gradient with respect to the normal text alignment line, and texts may be arranged in the inclined specific text alignment line to be displayed. This will be described in detail below.

The present exemplary embodiment provides a method of displaying texts by arranging the texts in the specific text alignment line at a different position from that of the normal text alignment line in order to express emotion or importance of a user who uses the portable terminal. The reason of predetermining the height of the text positioned in the specific text alignment line to be 90% or more of the height of the text positioned in the normal text alignment line is that a reason that a user wants to position the text in the specific text alignment line is to use it mainly for the purpose of highlighting the text.

For this reason, when the height of the text positioned in the specific text alignment line is too small as compared with the height of the text positioned in the normal text alignment line, it may be difficult for a user to highlight the text. In other words, when the height of the text positioned in the specific text alignment line is too small as compared with the height of the text positioned in the normal text alignment line like the superscript or the subscript, it may be difficult to highlight the text positioned in the specific text alignment line to display emotion. For reference, the superscript or the subscript is about 50 to 60% of the height of the text positioned in the normal text alignment line.

However, the text positioned in the normal text alignment line is flush with the text positioned in the specific text alignment line. In addition, a user may display his or her emotion by changing a font of the text positioned in the specific text alignment line or by increasing a size of the font, The text mentioned in the present invention indicates a concept including at least one text, word, or sentence, and a height 105 of the text indicates a height of the font.

In the present exemplary embodiment, a first specific text alignment line closest to the normal text alignment line is positioned between 30% and 120% of the height of the text positioned in the normal text alignment line immediately before it.

The first specific text alignment line described above indicates at least one of the specific text alignment lines h1 and –h1 closest to an upper side or a lower side of the normal text alignment line.

The reason that the text height is determined to be between 30% and 120% is that when the specific text alignment line according to the present exemplary embodiment is applied to the general text of the portable terminal, a number of the upper specific text alignment line may be in a range of one to four.

In FIG. 2, the upper first specific text alignment line h1 is positioned at 50% of the height of the text positioned in the normal text alignment line, and the upper second specific text alignment line h2 is positioned at 100% of the text height. In the example 100, a position of the lower first specific text alignment line –h1 is lower than that of the upper first specific text alignment line h1 with respect to the normal text alignment line 21. Accordingly, distances between the specific text alignment lines may be different from each other.

In the present exemplary embodiment, a number of the specific text alignment line positioned above the normal text alignment line may be in a range of one to four.

This is because when four or more specific text alignment lines are positioned above the normal text alignment line 21, it is generally difficult to distinguish a general font size of the screen of the portable terminal and a position of the specific text alignment line in a line space.

In other words, this is because when the screen of the portable terminal is narrow, a line space between sentences is narrow, and the number of the specific text alignment lines is too many, it is difficult to distinguish the position of the specific text alignment line in the narrow line space.

The specific text alignment line positioned above the normal text alignment line, mentioned in the present invention is the same as the upper specific text alignment line.

In the present exemplary embodiment, the number of the specific text alignment lines provided above the normal text alignment line is two, the first specific text alignment line closest to the normal text alignment line is positioned between 20% and 70% of the height of the text positioned in the normal text alignment line immediately before it, and the second specific text alignment line is positioned between 50% and 150% of the height of the text.

In FIG. 2, two upper specific text alignment lines and one lower specific text alignment line are illustrated.

The first specific text alignment line indicates a specific text alignment line h1 closest to the normal text alignment line, and the second specific text alignment line indicates a specific text alignment line h2 second closest to the normal text alignment line.

Figure 4:
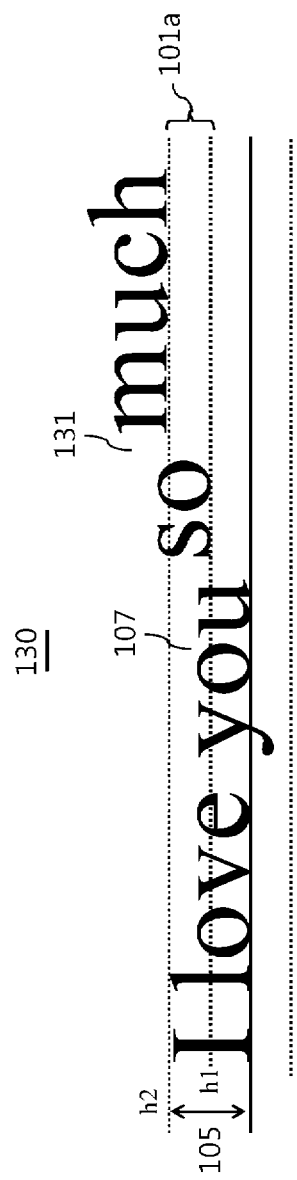
Figure 5:
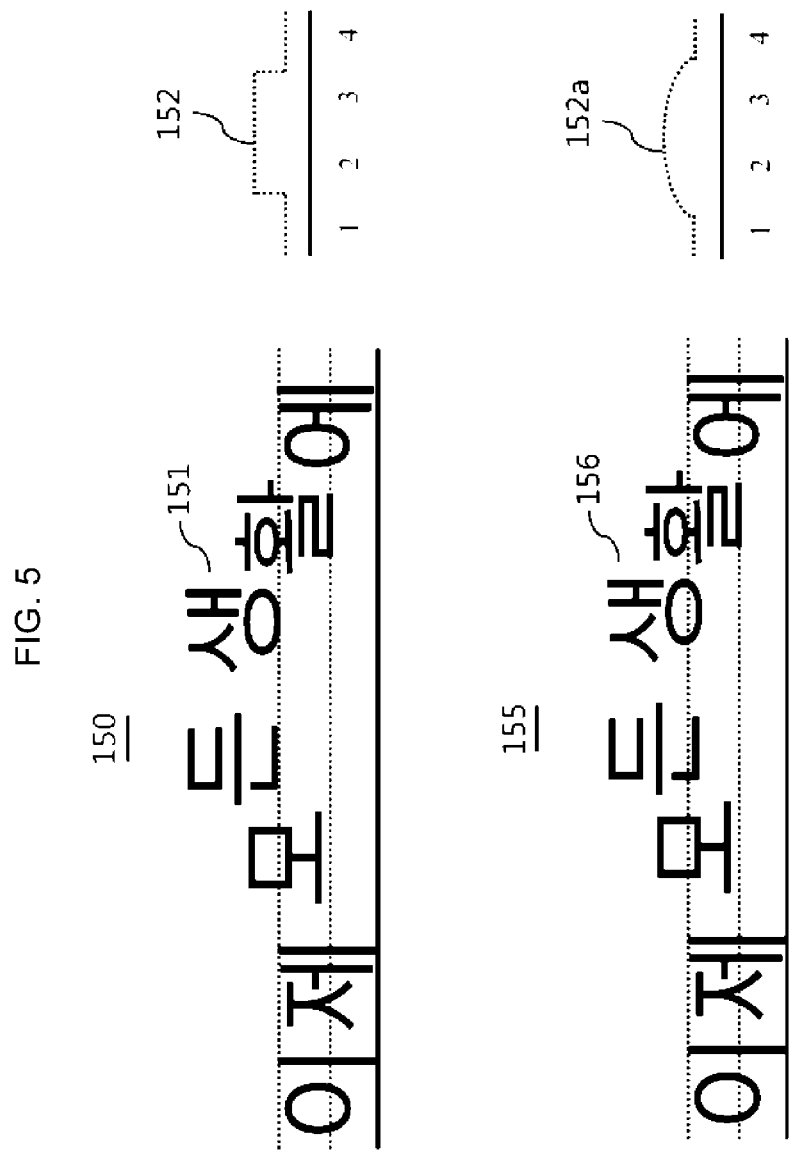

FIG. 3 to FIG. 5 illustrate examples to which specific text alignment lines are applied.

FIG. 3 illustrates examples 120 and 125 in which texts are positioned in the upper first specific text alignment line h1 according to the present exemplary embodiment. In the examples 120 and 125 of the drawing, "모든 생활" 121 is positioned in the upper first specific text alignment line h1, and other texts are arranged and positioned in the normal text alignment line 21. In this case, a text positioned in the normal text alignment line immediately before the text 121 positioned in the specific text alignment line may be "제" or "이제" 107. Accordingly, the text positioned in the normal text alignment line immediately before the text 121 positioned in the specific text alignment line may indicate a text or a word positioned in normal text alignment line immediately before the specific text alignment line The example 120 of FIG. 3 shows a case in which texts positioned in the normal text alignment line and the specific text alignment line have same font type and size.

In the upper example of FIG. 3, three specific text alignment lines h1, h2, and –h1 are provided. The lower example 125 of FIG. 3 shows a sentence in which " 모든 " " 생활 " is positioned in the upper first specific text alignment line according to the present exemplary embodiment.

FIG. 4 illustrates an English sample sentence 20a and an example 130 in which the text is positioned in the specific text alignment line according to the present exemplary embodiment In the sample sentence 20a of FIG. 4, the text is arranged in the normal text alignment line 21 to be displayed. However, the example 130 positioned at a lower side of FIG. 4 shows an example in which "so much" is positioned in the specific text alignment line according to the present exemplary embodiment.

In the example 130, "so" is positioned in the upper first specific text alignment line h1, and "much" is positioned in the upper second specific text alignment line h2. In the example, positions of the upper first and second specific text alignment lines are 50% and 100%, respectively, with respect to the height 105 of a text 107 positioned in the normal text alignment line immediately before it, i.e., with respect to a font height.

The height 105 of the text 107 positioned in the normal text alignment line immediately before it, mentioned in the present exemplary embodiment may indicate a font height of the 107. Specifically, in FIG. 4, the height 105 of "I" or "l" having a same font as that of "u" or "you" of the text 107 positioned in the normal text alignment line immediately before it serves as a text height of "u". In other words, in the present exemplary embodiment, the height of the text positioned in the normal text alignment line immediately before it may indicate a height of a font of the corresponding text.

A pattern input section is provided to select a pattern of the specific text alignment line.

The pattern input section may include a predetermined pattern used to select a position pattern of a text positioned in the specific text alignment line.

FIG. 5 illustrates two examples including text patterns 152 and 152a of the specific text alignment line. When the text pattern is included in the portable terminal, it will be collectively referred to as a pattern input section.

The examples 150 and 155 include the text patterns 152 and 152a related to " 모든 생활 " which is the text positioned in the specific text alignment line. In other words, a general pattern of the text positioned in the specific text alignment line on the screen of the portable terminal may be selected by using the text patterns 152 and 152a according to the present exemplary embodiment. An example in which the text pattern, i.e., the pattern input section is applied to the portable terminal will be described in detail with reference to FIG. 7 and FIG. 8.

In the upper example 150 of FIG. 5, " 보 " and " 활 " of the text positioned in the specific text alignment line are positioned in the upper first specific text alignment line h1, and " 는 " and " 생 " are positioned in the upper second specific text alignment line h2. Accordingly, the text has a shape in which a central portion of the text pattern 152 protrudes upwardly.

In contrast, according to the lower example 155 of FIG. 5, the text pattern 155a has a round shape. Accordingly, " 보 " and " 활 " of the texts positioned in the specific text alignment line are positioned in the upper first specific text alignment line h1. However, positions of " 는 " and " 생 " are automatically determined by the text pattern 152a. Thus, in the example 155, " 는 " and " 생 " are not positioned in the upper second specific text alignment line. This may be seen that they are positioned below the upper second specific text alignment line in the drawing.

A user may change a pattern of the specific text alignment line.

Figure 6:
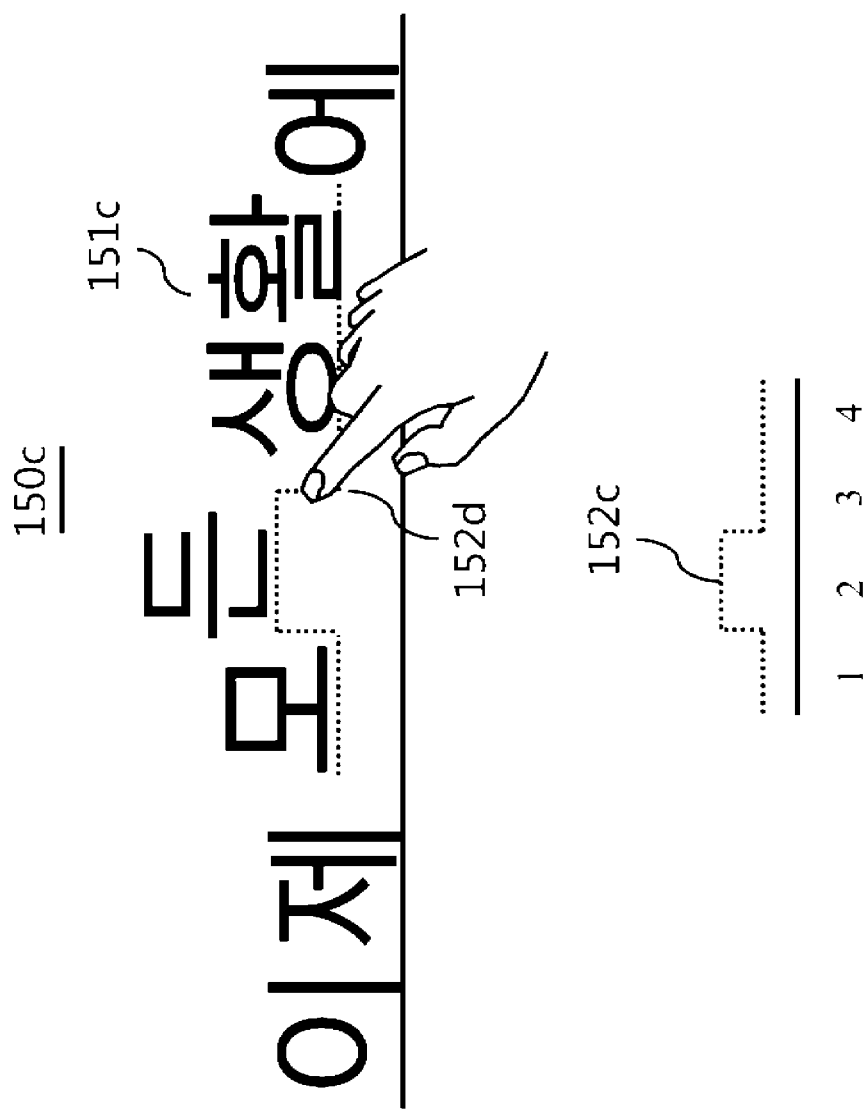
FIG. 6 illustrates a method of changing a pattern of a specific text alignment line by a user according to an exemplary embodiment of the present invention.

FIG. 6 illustrates a method of changing a pattern of a specific text alignment line by a user according to an exemplary embodiment of the present exemplary embodiment According to the present exemplary embodiment, the pattern of the specific text alignment line may be changed by a user. Specifically, when a user pushes a boundary portion of the specific text alignment line positioned in a center between " 생 " and " 활 " in a left direction in the upper example of FIG. 5, the user may change a pattern of the specific text alignment line according to the present exemplary embodiment in a way in which a boundary portion 152d of the specific text alignment line moves to a center of " 는 " and " 생 " as illustrated in FIG. 6.

Figure 7:
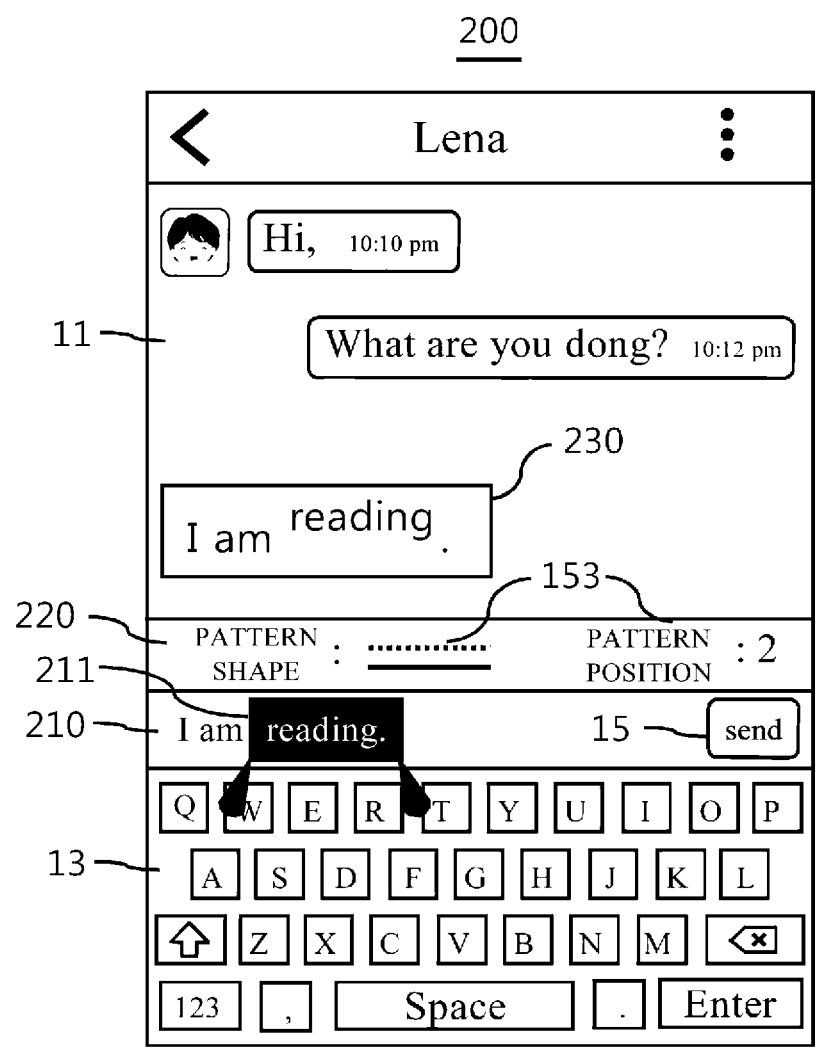
FIG. 7 to FIG. 9 illustrate exemplary embodiments in which a specific text alignment line is applied in a portable terminal according to an exemplary embodiment of the present invention
Figure 8:
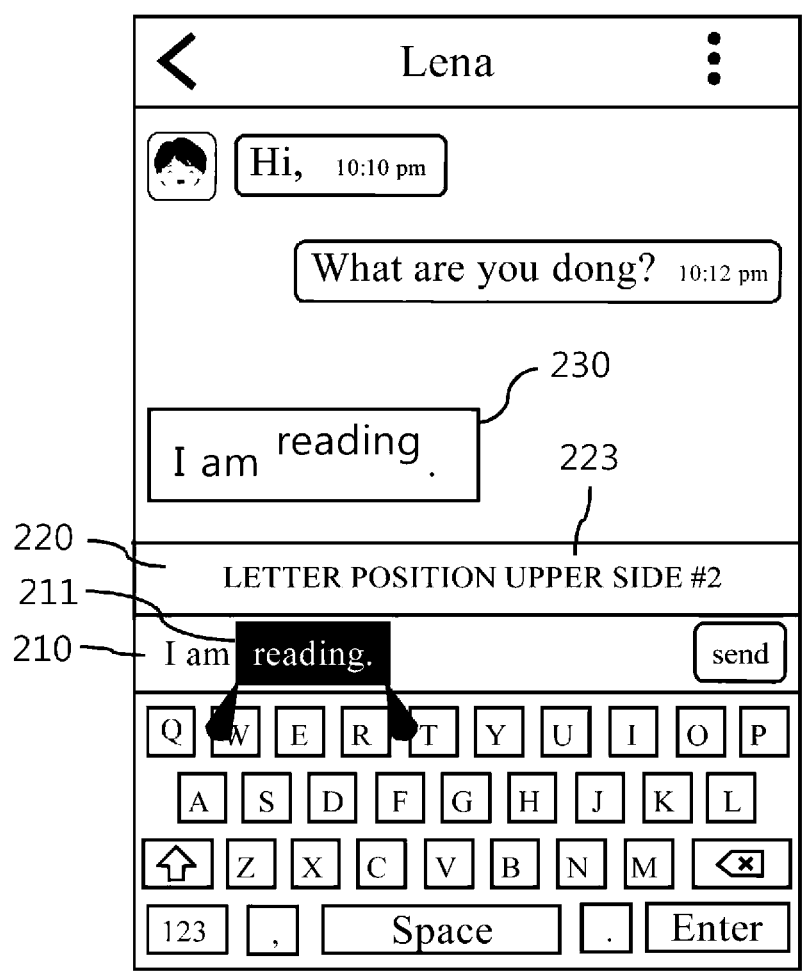
Figure 9:
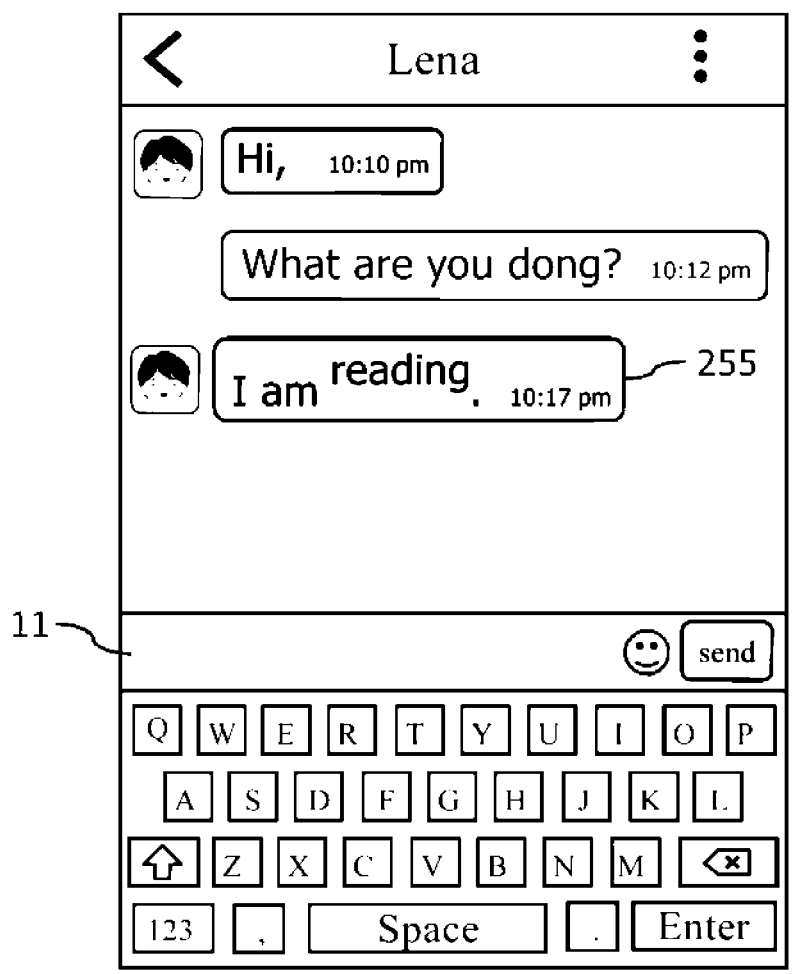

Alternatively, the user may obtain the same result as that of FIG. 6 by touching and pulling down " 생 " in a touch screen of the portable terminal to move a position of " 생 " to the upper first specific text alignment line h1. As such, the detailed method of changing a pattern of the specific text alignment line according to the present exemplary embodiment by the user may be diversified. However, the present exemplary embodiment may include all such methods FIG. 7 to FIG. 9 illustrate exemplary embodiments in which a specific text alignment line is applied in a portable terminal according to an exemplary embodiment of the present invention The example shows a screen 200, 200a, and 250 in which the specific text alignment lines according to the present exemplary embodiment is applied to an instant messenger of the portable terminal. In this case, the screen illustrates a screen in which the instant messenger is executed, and the instant messenger includes a virtual keyboard 13, a text display window 11, and a text input window 210

An application executed in the portable terminal may include at least one of a pattern input section 153 for selecting a pattern of the specific text alignment line or a position input section 223 for inputting a position of the specific text alignment line. The pattern input section 153 illustrated in FIG. 7 shows an example in which the text pattern 152 illustrated in FIG. 5 is applied to the portable terminal. In this case, the text pattern 152 may be applied such that different specific text alignment lines are positioned for each word as shown in FIG. 4 or each text is positioned in the different specific text alignment lines as shown in FIG. 5.

The screen 200 illustrated in FIG. 7 shows an example in which a user selects the pattern input section 153 for "reading" which is in a selected state in the text input window 210 and applies it to a text 211 of the selected state. In other words, the user may position the text 211 of the selected state in the specific text alignment line having a specific pattern in the text input window 210 by selecting the pattern input section 153 included in the pattern input window 220. In this case, the selected state refers to a state in which a user switches a specific text to the selected state by long-press of the portable terminal or the like. In this case, the text 211 of the selected state is generally displayed in a reversed color. In FIG. 7, the reading 211 is in the selected state. In FIG. 7, the pattern input section 153 is configured to include a pattern shape and a pattern position.

The present exemplary embodiment may include a function of preview 230 for previewing a result to which the pattern input section is applied. As illustrated in FIG. 7, the function of the preview 230 makes it possible to show a result obtained by applying a user input to the pattern input section or the position input section to a text of the selected state.

According to the present exemplary embodiment, a position input section 223 is provided to input a position of the specific text alignment line.

FIG. 8 illustrates a screen 200a of a portable terminal including a position input section 223 according to the present exemplary embodiment.

The drawing shows a result obtained when a user selects an upper side #2 in the position input section 223 positioned in the pattern input window 220 on the screen of the portable terminal. In this case, the user may select and input a position of the specific text alignment line of the text 211 of the selected state by using the position input section.

FIG. 9 illustrates the screen 250 of the portable terminal after the text of the instant messenger illustrated in FIG. 7. In other words, FIG. 9 illustrates the screen 250 of the portable terminal after the user selects a transmission button 15 in the instant messenger illustrated in FIG. 7 to transmit the text of the text input window 210 to the other party. In this case, "reading" is applied with the specific text alignment line in the transmitted text 255.

According to the present exemplary embodiment, a method of displaying a text on a screen of a portable terminal may include arranging and displaying a text in a specific text alignment line that is inclined at a specific angle with respect to a normal text alignment line in which a text is generally arranged.

Figure 11:
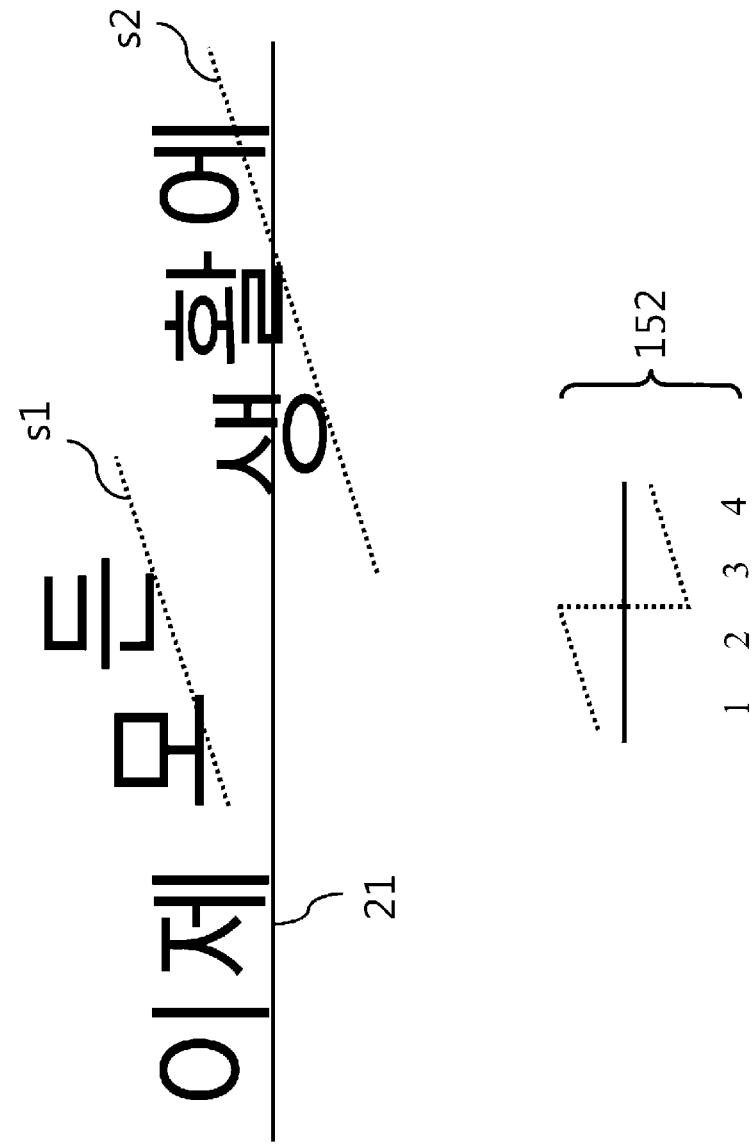

FIG. 10 and FIG. 11 illustrate examples of displaying texts are displayed on a specific text alignment line that is inclined at a specific angle according to an exemplary embodiment of the present invention FIG. 10 illustrates an example 300 in which the specific text alignment line according to the present exemplary embodiment is applied to the sample sentence. In the lower example 300, the text is arranged in a specific text alignment line s1 that is inclined at a specific angle 1 with respect to the normal text alignment line 21 to be displayed. According to the present exemplary embodiment, as in the example, a text may be arranged in a specific text alignment line that is inclined at a specific angle with respect to the normal text alignment line to be displayed.

FIG. 11 illustrates two inclined specific text alignment lines s1 and s2 and a text pattern 152. The example 301 illustrates a case in which "모든" is positioned in the first specific text alignment line s1, and "생활" is positioned in the second specific text alignment line s2. According to the present exemplary embodiment, as in the example 301, one or more specific text alignment lines may be inclined at the specific angle. When two or more specific text alignment lines are inclined at the specific angle, the specific angle may include different specific angles.

According to the present invention, a pattern input section may be included to select the text pattern 152 positioned in the inclined specific text alignment line in the portable terminal.

According to the present exemplary embodiment, the specific angle of the specific text alignment line ranges between 0.5° to 15°.

This is because the text positioned in the specific text alignment line needs to match with adjacent upper or lower texts in the portable terminal. In general, the specific angle of the specific text alignment line may not be too large for matching with other texts.

However, in the present exemplary embodiment, the specific angle of the specific text alignment line need not necessarily be limited to 15°. This is because the inclined specific text alignment line according to the present exemplary embodiment may be used at arbitrary angles for decoration purpose as texts.

According to the present exemplary embodiment, a gradient input section for inputting a gradient of the specific text alignment line.

Figure 12:
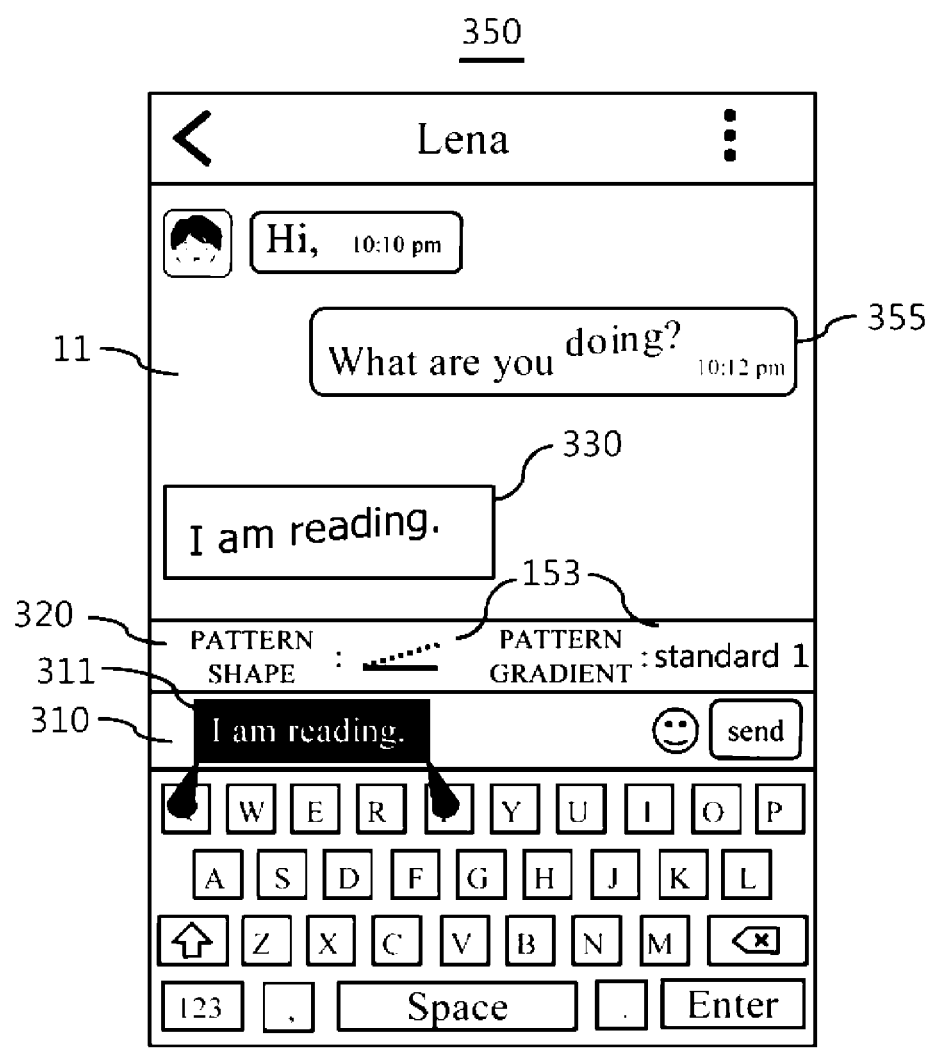
FIG. 12 and FIG. 13 illustrate exemplary embodiments in which a specific text alignment line that is inclined at a specific angle is applied according to an exemplary embodiment of the present invention
Figure 13:
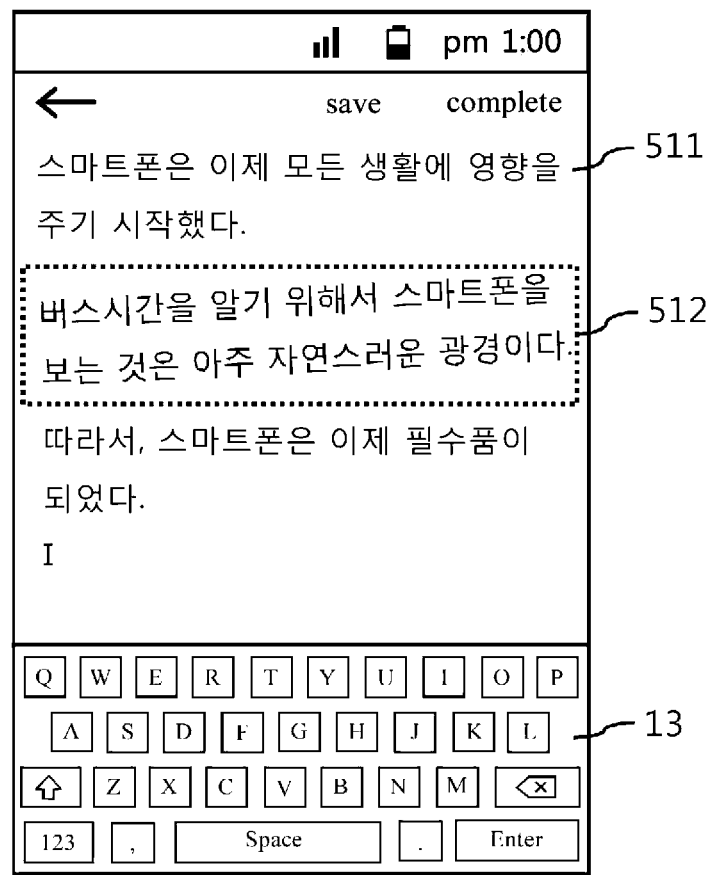

FIG. 12 and FIG. 13 illustrate exemplary embodiments in which a specific text alignment line that is inclined at a specific angle is applied according to an exemplary embodiment of the present invention FIG. 12 illustrates an exemplary embodiment of a screen 350 of a portable terminal applied with a specific text alignment line according to the present invention, including a pattern input section 153 and a function of preview 320.

In the drawing, the pattern input window 320 includes the pattern input section 153, and the pattern input section may input a pattern shape and a pattern gradient. According to the present exemplary embodiment, a gradient of the specific text alignment line may be inputted or selected through the pattern gradient. When a user selects the pattern shape and the pattern gradient in the pattern input section 153, they may be applied to "I am reading" which is a text 311 of the selected state in the text input window 310, and a result thereof may be displayed through a preview 330.

In addition, the screen 350 includes a text 355 applied with the specific text alignment line transmitted by the other part on the text display window 11 of the portable terminal. For example, a word "doing" applied with the specific text alignment line in the transmitted text 355 is inclined at a specific angle with respect to the normal text alignment line 21, and a first letter "d" is positioned in the specific text alignment line.

As a result, the specific text alignment line according to the present exemplary embodiment may be inclined at a specific angle with respect to the normal text alignment line, or may be formed to include at least one of specific text alignment lines positioned at different points with respect to the normal text alignment line.

FIG. 13 illustrates a screen 500 of a portable terminal in which a specific text alignment line is applied to a sentence 512 according to an exemplary embodiment of the present invention.

The screen 500 illustrates a screen of a text editor for inputting a text into a text display window 511 by using a virtual keyboard 13 in a portable terminal. The example shows a case where a sentence 512 applied with the specific text alignment line according to the present exemplary embodiment is positioned in a center of a general paragraph.

According to an exemplary embodiment of the present invention, a recorded medium recorded with a program for executing a method of displaying a text on a screen of a portable terminal is included, the recorded medium being readable by a computer.

The exemplary embodiments of the present invention may be realized in hardware, software, or a combination thereof. The method according to the present invention may be performed by any portable terminal having a computing function and a communications function, and may be implemented in the form of program instructions and recorded in a computer-readable storage medium. The computer-readable storage medium may be of any form or configuration as long as it is composed of program instructions, data files, data structures, etc., alone or in a combination thereof, and is configured to store and execute program instructions. The computer-readable storage medium may also be stored and executed in the form of computer readable code in a distributed manner on an independent or networked computer system.

It is understood that the storage unit included in the portable terminal is an example of a machine-readable storage medium storing any program or programs including instructions for implementing the exemplary embodiments of the present invention. Such an arbitrary program may be, e.g., a volatile or non-volatile storage such as ROM; memory such as RAM, memory chip, a device, or integrated circuit; or a storage medium such as CD, DVD, magnetic disk, or magnetic tape which can be optically or magnetically recordable and readable by a machine (e.g., computer), regardless of whether or not it is erasable or rewritable.

The present invention described above, the present invention belongs to technology's to those having ordinary skill in the field of the number of in place, without departing from the spirit of the invention substituted, can be modified and changed, so that for example, and the accompanying the above-described exemplary It not limited by the drawings. However, it should be understood to include the not intended to limit the invention to the specific embodiment, all of the changes that are included in the spirit and scope of the present invention, equivalent to replace.

The invention claimed is:

1. A portable terminal comprising:
   a virtual keyboard;
   a text input window configured to receive a text from the virtual keyboard; and
   a text display window configured to display a text inputted into the text input window,
   wherein the text input window includes:
   a normal text alignment line on which a text is generally arranged to be displayed; and
   at least one specific text alignment line on which the text is arranged to be displayed regardless of the normal text alignment line and to which the text is moved and positioned in response to user manipulation,
   wherein a height of the text positioned in the specific text alignment line is 90% or more of a height of a text positioned in the normal text alignment line immediately before the specific text alignment line, and
   wherein the text positioned on at least one of the normal text alignment line and the at least one specific text alignment line is moved among the normal text alignment line and the at least one specific text alignment line in response to the user manipulation.

2. The portable terminal of claim 1, wherein:
the text input window is configured in such a manner that a part of the text is moved among the normal text alignment line and the at least one specific text alignment line in response to the user manipulation, and
the at least one specific text alignment line is preset before the user manipulation is input.

3. The portable terminal of claim 1, further comprising:
at least one of a position input section, a pattern input section, and a gradient input section, wherein:
the position input section is configured to input a position of the specific text alignment line;
the pattern input section is configured to input a pattern of a text positioned in the specific text alignment line; and
the gradient input section is configured to input a gradient of the specific text alignment line.

4. The portable terminal of claim 3, wherein a selected text is changed by at least one of the position input section, the pattern input section, and the gradient input section in the text input window to be displayed on the text display window.

5. The portable terminal of claim 3, wherein the text of the text display window is changed depending on a user input for at least one of the position input section, the pattern input section, and the gradient input section, to be displayed on the text display window.

6. A method of displaying a text on a screen of a portable terminal including a virtual keyboard, a text input window configured to receive a text from the virtual keyboard, and a text display window configured to display a text inputted into the text input window, the method comprising:

arranging the text on a normal text alignment line generally and displaying the text on the text display window; and
arranging the text on at least one specific text alignment line regardless of the normal text alignment line and displaying the text on the text display window, the at least one specific text alignment line being provided for the text to be moved and positioned thereto in response to user manipulation,
wherein a height of the text positioned in the specific text alignment line is 90% or more of a height of a text positioned in the normal text alignment line immediately before the specific text alignment line, and
wherein the text positioned on at least one of the normal text alignment line and the at least one specific text alignment line is moved among the normal text alignment line and the at least one specific text alignment line in response to the user manipulation.

7. The method of claim 6, wherein:
a part of the text is moved among the normal text alignment line and the at least one specific text alignment line in response to the user manipulation, and
the at least one specific text alignment line is preset before the user manipulation is input.

8. The method of claim 6, wherein the text of the text display window is changed in at least one of a position, a pattern and a gradient of the specific text alignment line depending on the selected text of text input window, to display the text on the text display window.

9. The method of claim 6, wherein the text of the text display window is changed in at least one of a position, a pattern of the text and a gradient of the specific text alignment line depending on a user input, to display the text on the text display window.

* * * * *